Oct. 22, 1935.   W. A. EATON ET AL   2,018,202
VALVE STRUCTURE
Filed Jan. 19, 1931   3 Sheets—Sheet 1
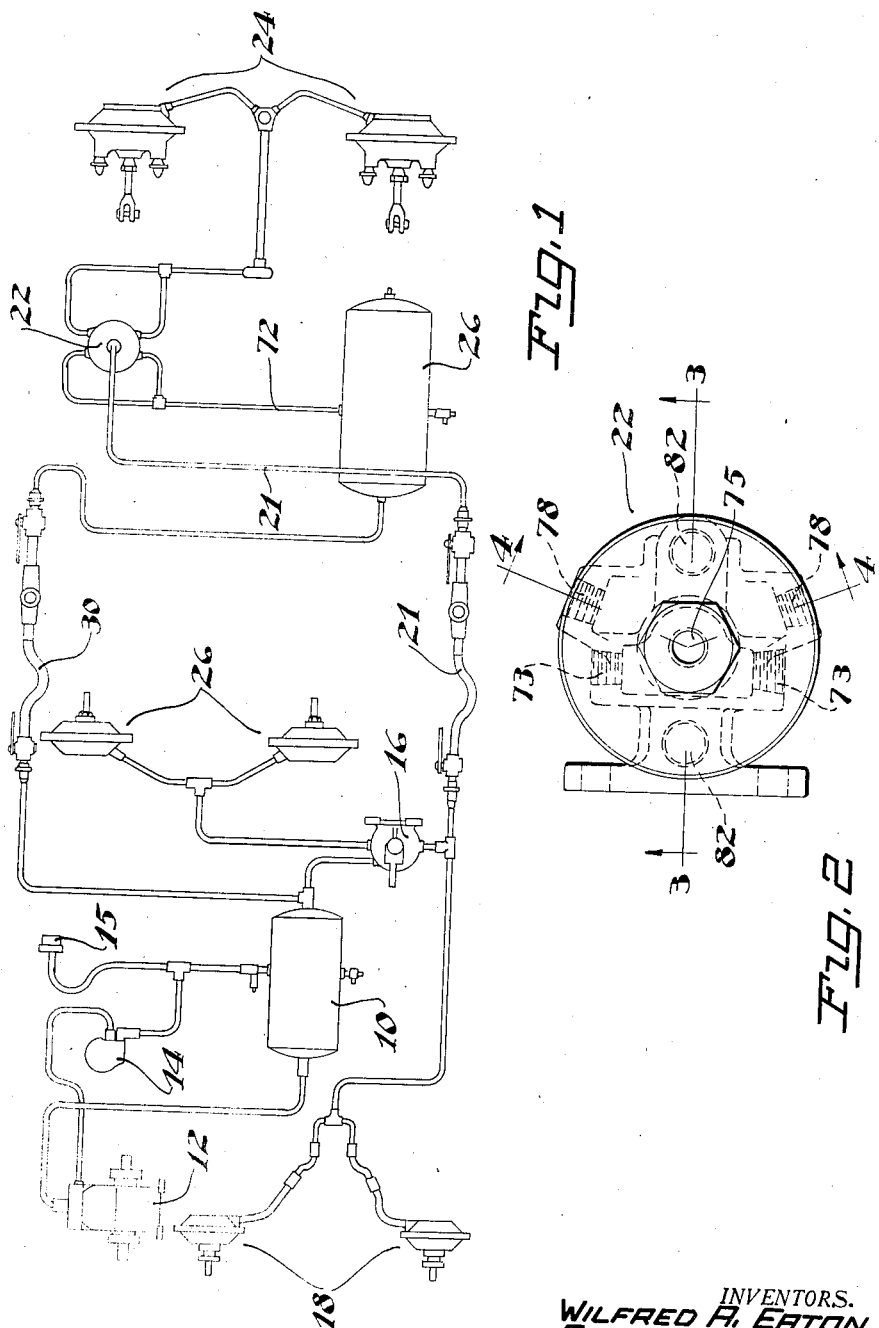
INVENTORS.
WILFRED A. EATON
STEPHEN VORECH
BY
J. O. Clayton
ATTORNEY

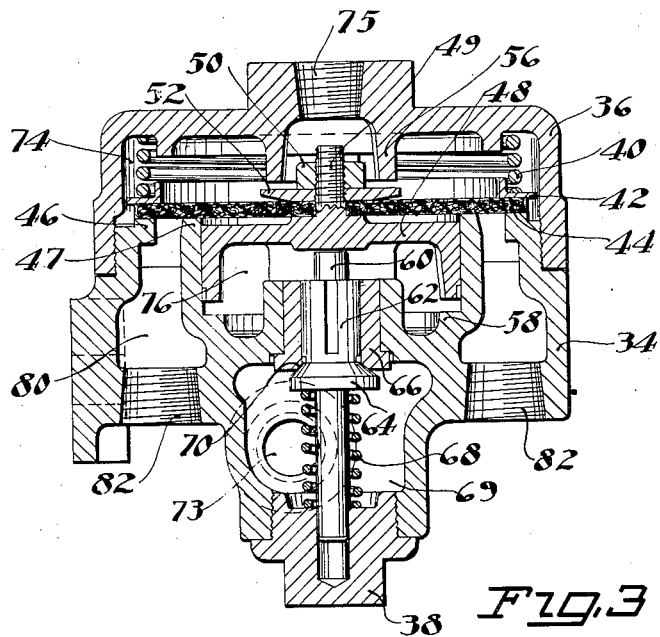
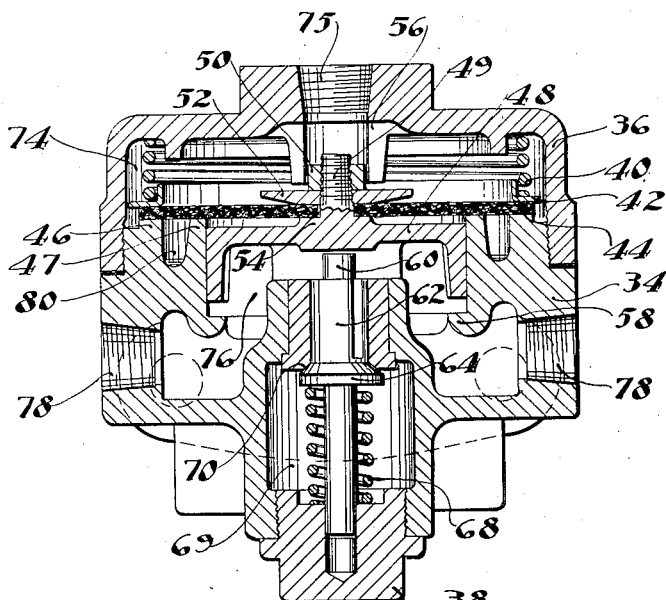

Oct. 22, 1935.  W. A. EATON ET AL  2,018,202

VALVE STRUCTURE

Filed Jan. 19, 1931   3 Sheets-Sheet 3

INVENTORS.
WILFRED A. EATON
STEPHEN VORECH
BY
ATTORNEY

Patented Oct. 22, 1935

2,018,202

UNITED STATES PATENT OFFICE 2,018,202

VALVE STRUCTURE

Wilfred A. Eaton and Stephen Vorech, Pittsburgh, Pa., assignors to Bendix Westinghouse Automotive Air Brake Company, Pittsburgh, Pa., a corporation of Delaware Application January 19, 1931, Serial No. 509,857

8 Claims. (Cl. 303—28)

This invention relates in general to valve structures, and more particularly to a relay valve of the self-lapping type.

The problem of effecting simultaneous or substantially simultaneous application of truck and trailer brake mechanisms has been to a degree solved by the employment of a relay or "quick application and release" valve of the type disclosed in Lewis Patent No. 1,438,317 and the instant invention has been designed to appreciably increase the effectiveness and efficiency of this type of valve. Another object of the invention is to provide an economical valve, both from the manufacturing and service standpoints.

A further object of the invention is to provide a relay valve employing the usual intake valve controlling diaphragm member as disclosed in the afore-mentioned patent which diaphragm, however, performs the additional function of an exhaust valve element. The number of valve parts is reduced with such a structure and a quick release of the brake made possible due to the relatively large exhaust valve area.

Still another object of the invention is to provide a valve structure which reduces to a minimum the force necessary to actuate or open the valve and to this end the diaphragm or driving element of the valve is constructed and arranged to act as a lever.

Other features and objects of the invention, including the reduction in size of this type of valve and other new combinations of parts and desirable particular constructions, will be apparent from the following description of the illustrative embodiments shown in the accompanying drawings in which:

Figure 1 is a diagrammatic view of a truck and trailer fluid pressure brake equipment embodying our relay valve structure.

Figure 2 is a plan view of the valve.

Figures 3 and 4 are central sections taken respectively on lines 3—3 and 4—4 of Figure 2.

Figure 5:
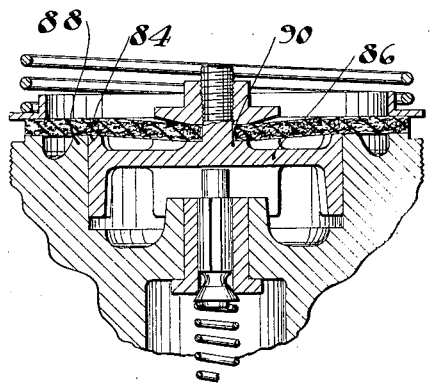
Figure 6:
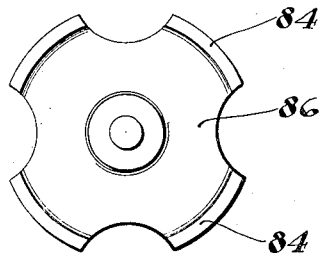

Figure 5 is a fragmentary view disclosing a modified form of diaphragm and guide structure; and Figure 6 is a plan view of the guide or force transmitting stem of the exhaust valve member of Figure 5.

In Figure 1, there is disclosed truck and trailer brake equipment comprising a truck reservoir 10, charged by a compressor 12 with the usual governor 14 and air gauge 15 in circuit.

Master brake valve 16 on the truck, controls the brake pressure to the front and rear truck brake chambers 18 and 20 respectively, and also controls through a service line 21, the operation of our novel relay valve 22, the latter controlling the operation of the trailer brake chambers 24. The air pressure for the trailer chambers is supplied by a trailer reservoir 26, the pressure of the latter being maintained by the truck reservoir 10 through interconnecting line 30.

Our invention is particularly concerned with the refinement of the relay valve 22. This valve, shown in detail in Figures 3 and 4, comprises a casing having a central body portion 34 closed at its ends by cap members 36 and 38. A spring 40 is compressed between the inner face of the cap 36 and a ring member 42, the latter retaining the edge area of a flexible diaphragm member 44 in contact with annular flanges or ring-like portions 46 and 47 of the casing body 34. To the center of the diaphragm is secured a force transmitting piston-like guide member 48. The diaphragm is sleeved over a projecting threaded stem 49 on the guide, nuts 50 and 52 being threaded on the stem to rigidly clamp the diaphragm to a raised seat 54 on the guide, the latter being recessed in its peripheral edge. Stops 56 and 58 in the cap 36 and casing body 34, respectively, serve to limit the reciprocatory movement of the diaphragm and guide. The diaphragm serves both as an intake valve actuating member and exhaust valve member in a manner discussed in greater detail hereinafter.

The guide member is adapted to abut a cylindrical projection 60 extending from a recessed projection 62 of an intake valve member 64, the projection 62 being slidably received within a sleeve member 66 preferably pressed into a tubular bore in the casing body. The intake valve member 64 is preferably of the poppet type and is yieldingly urged by spring 68 into contact with an intake valve seat 70 at the end of the sleeve 66.

In operation, the intake valve member 64 is normally seated as disclosed in Figures 3 and 4, thus closing off the pressure chamber 69 from the remainder of the valve. Chamber 69 is at all times in communication with the trailer reservoir 26 by means of line 72 connected to ports 73 in the chamber. When it is desired to actuate the truck and trailer brakes the master valve 16 is cracked, the truck brake chambers being directly energized and the trailer brake chambers being indirectly energized through the relay valve. The latter operation is effected by the admission of a relatively small quantity of air into the service line 21 which air is supplied to port 75 thence to a chamber 74 defined by the cap 36 and diaphragm 44.

The chamber 76 defined by the diaphragm 44 and casing body 34, is in constant communication, through ports 78, with the trailer brake chambers 24, and this chamber 76, during the release of the brake, is in communication with a chamber 80 by means of the recesses in the rim of the guide 48 and the loose fit between the diaphragm and the exhaust valve seat 47. The chamber 80 is vented to the atmosphere by ports 82. The small quantity of air admitted to the chamber 74 to actuate the valve thus gives rise to a pressure differential between the chambers 74 and 76, as well as a differential between the chambers 74 and 80. The diaphragm 44 is then sealed against flange 47 and, when the load of the spring 68 plus the air pressure acting on valve 64 is overcome, the valve 64 is opened by the thrust of the guide acting on projection 62. Air under pressure then flows into chamber 76 and out through ports 78 to the trailer brake chambers to apply the brakes. As air continues to flow, it is evident that the pressure in the brake chambers and in chamber 76 will build up to a point where the air in the chamber together with the loading effect of the spring 68 will place the guide member in equilibrium under the action of the oppositely acting forces. When the equilibrium is disturbed by an excess of air pressure spring 68 acts to close the valve 64 against its seat 70.

The valve is now in the so-called lapped condition, the brakes being held as applied. The pressure differential between the chambers 74 and 76 and the differential between the chambers 74 and 80 serve to provide an exhaust valve seal of the diaphragm at the flange 47. Should it now be desired to apply the brakes with a greater effect, it is merely necessary to further crack the master valve 16, thus admitting an additional quantity of air to the relay valve which upsets the existing equilibrium of forces acting on the guide 48 to again crack the inlet valve and initiate the cycle of operations.

Now if it is desired to exhaust air from the brake chambers to effect a partial release of the brakes, a reduction of pressure is made in chamber 74 by means of the master brake valve 16. The higher pressure below the diaphragm 44 then forces the latter upwardly and away from the exhaust valve seat 47 allowing air from the brake chambers to pass over the seat 47 to chamber 80 and thence to the atmosphere through exhaust ports 82. This exhausting action will continue until the pressure has dropped sufficiently to allow the pressure above the diaphragm to bring it against exhaust valve seat 47 thus preventing further escape of air from chamber 76. The valve is therefore self-lapping and any change of pressure in chamber 74 will result in a corresponding change of pressure in chamber 76.

As noted above, during all intermediate phases in the valve operation, a slightly lower pressure exists in chamber 76 than in chamber 74. This is due to the aforementioned spring and air loading effect on the inlet valve 64. This loading effect necessitates an appreciable applying force to crack the inlet valve and this force can only be obtained, in the structure disclosed, by the admission of definite quantities of air to the relay valve. In order to reduce this necessary force there is suggested the structure of Figures 5 and 6, wherein the diaphragm acts as a lever member in cracking the valve.

The peripheral edge of the guide 86 is preferably provided with raised portions or lands 84 adjacent the exhaust valve seat 88 and the central seat 90 of the guide is positioned slightly below the plane of the land portions. This structure has the effect of slightly cupping the diaphragm at the center, placing the material in tension to stiffen it. Now when the diaphragm is flexed downwardly the area of contact with the valve seat 88 acts as a fulcrum point. The effort or applying force of the lever is about the center of the diaphragm and the point of resistance is at the lands 84 adjacent the fulcrum. A lever of the second class is thus provided which, by virtue of the relative length of the moment arms, reduces the force necessary to move the guide. The force necessary to crack the valve is thus reduced to a minimum.

A very simple and economical self-lapping relay valve is thus provided. The diaphragm functions both as a means for applying the inlet valve and as an exhaust valve element. The relatively large opening between the diaphragm and its seat also causes a very quick venting of the brake chambers, thus providing a desirable quick release of the brakes; furthermore, a minimum of air pressure from the master valve is necessary to actuate the relay valve and the means for internally mounting the diaphragm permits of a reduction in outside diameter of the valve.

While it will be apparent that the illustrated embodiments of our invention herein disclosed are well calculated to adequately fulfill the objects and advantages primarily stated, it is to be understood that the invention is subject to variations, modification, and change within the spirit and scope of the subjoined claims.

For example, the diaphragm member might be yieldingly operated, manually or otherwise, in which event the valve might find useful application for other purposes.

We claim:

1. In a control valve structure, a casing member, a diaphragm within said casing, an exhaust valve seat provided within said casing and constructed to receive said diaphragm adjacent the periphery of the latter, and spring means resiliently urging the peripheral portion of said diaphragm on said valve seat.

2. In a control valve structure, a reciprocatory intake valve member, a casing, a diaphragm within said casing, an exhaust valve seat provided within said casing and constructed and arranged to receive said diaphragm, a valve actuating guide means secured to said diaphragm centrally thereof, said diaphragm contacting the periphery of said guide means in a plane different from the plane of the central portion of the diaphragm, and means for admitting fluid under pressure to said casing to actuate said diaphragm, the latter, when actuated, acting as a lever in effecting the opening of said intake valve member.

3. In a control valve structure a reciprocatory intake valve, a casing, a flexible member within said casing, an exhaust valve seat provided within said casing, said seat being constructed and arranged to receive said flexible member, a valve actuating guide means having a peripheral portion contacting said flexible member, means for securing the central portion of the flexible member to the guide means, said securing means cupping the flexible member downwardly from the plane of said peripheral portion, and means for actuating said flexible member, the latter when actuated acting as a lever in effecting the opening of the intake valve.

4. In a control valve structure, a casing, a driving element within the casing, and force transmitting means centrally secured to said driving element, said means comprising a piston-like member provided with a raised peripheral portion contacting said driving element in a plane different from the plane of the central portion thereof secured to said element.

5. In a control valve structure, a casing member, a diaphragm within said casing together with force transmitting means secured to said diaphragm upon a centrally located seat portion on said force transmitting means, said means comprising a piston-like member provided with recesses and raised seat portions in its peripheral edge, said centrally located seat portion and said raised peripheral seat portions lying in different planes.

6. In a control valve structure a casing, an annular ring-like portion in said casing, a diaphragm in said casing and resting on said ring-like portion, an annular ring mounted on said diaphragm opposite said ring-like portion and yieldable means pressing against said annular ring whereby said diaphragm is yieldably pressed against said ring-like portion.

7. In a control valve structure, a casing, a pair of concentric ring-like portions in said casing forming therebetween an annular exhaust chamber, a valve operating member lying within said ring-like portions, a diaphragm in said casing for operating said valve operating member, said diaphragm contacting both of said ring-like portions and forming a valve to control admission of fluid to said exhaust chamber and a spring resiliently urging the peripheral portion of said diaphragm against said ring-like portions.

8. A control valve structure comprising a casing, an internal cup-shaped member in said casing having a cylindrical inner wall, the space between said cup-shaped member and said casing forming an exhaust chamber, a piston-like guide member mounted in said cup-shaped member for reciprocation therein, an inlet valve in said casing adapted to be opened by movement of said guide member and a diaphragm secured to said guide member for moving the same, said diaphragm also controlling the admission of fluid to said exhaust chamber.

WILFRED A. EATON.
STEPHEN VORECH.